United States Patent
Olsen et al.

(10) Patent No.: US 12,017,673 B2
(45) Date of Patent: Jun. 25, 2024

(54) MONITORING SYSTEM FOR A VEHICLE

(71) Applicant: Volvo Car Corporation, Gothenburg (SE)

(72) Inventors: Hans Erik Olsen, Gothenburg (SE); Tobias Bergenblock, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 72 days.

(21) Appl. No.: 17/661,951

(22) Filed: May 4, 2022

(65) Prior Publication Data
US 2022/0396283 A1 Dec. 15, 2022

(30) Foreign Application Priority Data

Jun. 9, 2021 (EP) .................................... 21178559

(51) Int. Cl.
*B60W 50/14* (2020.01)
*B60K 35/00* (2006.01)
(Continued)

(52) U.S. Cl.
CPC ............ *B60W 50/14* (2013.01); *B60K 35/00* (2013.01); *B60L 58/13* (2019.02); *B60K 35/10* (2024.01);
(Continued)

(58) Field of Classification Search
CPC ......... B60W 50/14; B60W 2050/0063; B60W 2050/146; B60W 2510/244; B60K 35/00;
(Continued)

(56) References Cited

U.S. PATENT DOCUMENTS 11,505,070 B2 * 11/2022 Higuchi ................ B60K 35/00
2007/0208468 A1 * 9/2007 Sankaran ............... B60K 35/00
701/31.4

(Continued)

FOREIGN PATENT DOCUMENTS

DE 102011116313 A1 * 4/2013 ............. B60K 35/00
DE 102011116313 A1 4/2013
(Continued)

OTHER PUBLICATIONS

Extended European Search Report for European Application No. 21178559.7 dated Dec. 3, 2021, 9 pages.

*Primary Examiner* — Mohamed Barakat
(74) *Attorney, Agent, or Firm* — Amin, Turocy & Watson, LLP

(57) ABSTRACT

The present disclosure relates to a monitoring system for a vehicle, a vehicle comprising such a monitoring system, a method for monitoring such a vehicle and a computer program element for monitoring such a vehicle.

The monitoring system comprises a display unit, an adjustment tool and a control unit. The control unit is configured to generate an energy flow map showing an energy flow from an energy storage system to at least one sub-system of the vehicle. The display unit is configured to display the energy flow map, to graphically emphasize the at least one sub-system and to display a current energy consumption of the sub-system. The control unit is further configured to adjust the energy consumption of the sub-system based on a user's input to the adjustment tool.

20 Claims, 1 Drawing Sheet

(51) Int. Cl.
*B60L 58/13* (2019.01)
*B60K 35/10* (2024.01)
*B60K 35/28* (2024.01)
*B60K 35/29* (2024.01)
*B60W 50/00* (2006.01)

(52) U.S. Cl.
CPC .............. *B60K 35/28* (2024.01); *B60K 35/29* (2024.01); *B60K 2360/119* (2024.01); *B60K 2360/161* (2024.01); *B60K 2360/169* (2024.01); *B60K 2360/195* (2024.01); *B60L 2250/16* (2013.01); *B60W 2050/0063* (2013.01); *B60W 2050/146* (2013.01); *B60W 2510/244* (2013.01)

(58) Field of Classification Search
CPC ........ B60K 2370/119; B60K 2370/161; B60K 2370/169; B60K 2370/193; B60K 2370/195; B60K 35/10; B60K 35/28; B60K 35/29; B60L 2250/16; B60L 58/13
See application file for complete search history.

(56) References Cited

U.S. PATENT DOCUMENTS

| | | | |
|---|---|---|---|
| 2012/0143410 A1* | 6/2012 | Gallagher | B60L 58/12 701/22 |
| 2015/0291036 A1* | 10/2015 | Ryu | B60K 35/00 701/22 |
| 2016/0068121 A1 | 3/2016 | Maini et al. | |

FOREIGN PATENT DOCUMENTS

| | | |
|---|---|---|
| JP | 2007336656 A | 12/2007 |
| WO | 2015166069 A2 | 11/2015 |
| WO | 2018077518 A1 | 5/2018 |

\* cited by examiner

MONITORING SYSTEM FOR A VEHICLE

CROSS-REFERENCE TO RELATED APPLICATIONS

The subject application claims priority to EP Patent Application No. EP21178559.7, entitled "Monitoring system for a vehicle," and filed on Jun. 9, 2021. The respective entirety of the above noted priority application is hereby incorporated herein by reference.

TECHNICAL FIELD

The present disclosure relates to a monitoring system for a vehicle, a vehicle comprising such a monitoring system, a method for monitoring such a vehicle and a computer program element for monitoring such a vehicle.

BACKGROUND ART

Today, many high-level functions and hidden systems are integrated in a vehicle to facilitate operation of the vehicle. Such functions and systems are powered by a battery system arranged in the vehicle and generally controlled automatically. Hence, in some cases, it is difficult to manually control or even disable an individual function or system by a user. Particularly, if an energy consumption of the vehicle needs to be optimized, the user requires reliable information on an energy flow in the vehicle to minimize an unnecessary energy consumption.

SUMMARY

Hence, there may be a need to provide an improved monitoring system, which provides reliable information on a current energy consumption in a vehicle.

The problem is solved by the subject matters of the independent claims of the present disclosure, wherein further embodiments are incorporated in the dependent claims. It should be noted that the aspects of the disclosure described in the following apply to the monitoring system for a vehicle, the vehicle comprising such a monitoring system and the method for monitoring such a vehicle and the computer program element for monitoring such a vehicle.

According to the present disclosure, a monitoring system for a vehicle is presented. The monitoring system comprises a display unit, an adjustment tool and a control unit. The control unit is configured to generate an energy flow map showing an energy flow from an energy storage system to at least one sub-system of the vehicle. The display unit is configured to display the energy flow map, graphically emphasize the at least one sub-system on the energy flow map and to display a current energy consumption of the sub-system. The control unit is further configured to adjust the energy consumption of the sub-system based on a user's input to the adjustment tool.

The monitoring system according to the present disclosure provides an interactive energy flow map with the user. The monitoring system may be integrated in a user interface system such as an infotainment system. The user may receive not only an overview but also detailed information on an energy consumption in the vehicle. In particular, the monitoring system allows a graphical representation on the current energy consumption, how overall energy of the vehicle is distributed and/or consumed in sub-systems of the vehicle. Based on such information, the user may select manually and individually a sub-system and adjust its energy consumption to minimize unnecessary energy consumption, thus to utilize energy efficiently.

The display unit may be configured to visualize image data received from the control unit. The display unit may be arranged in a visual range of a driver of the vehicle to facilitate a utilization of the display unit. The display unit may be integrated in a Center Stack Display (SCD), Drivers Information Module (DIM) and/or Infotainment Head Unit (IHU). The display unit may be further configured to visualize, for example, vehicle information, entertainment programs, navigation assistance and/or any application set by the user. In the display unit, a graphical user interface (GUI) may be embedded to realize an interaction with the user via the display unit.

The control unit may be an electronic control unit and it may be connected to various systems and/or sensors of the vehicle. The control unit may be configured to continuously collect information on a current state of the vehicle, particularly currently available energy amount of the energy storage system and the current energy consumption of the vehicle. The energy storage system may be a battery system supplying electrical power to various sub-systems of the vehicle to operate them. The energy amount of the energy storage system may be correlated with charging/discharging data of the battery system.

The current energy consumption of the vehicle may be subdivided into the current energy consumption of each sub-system of the vehicle. Each sub-system may be subdivided again into a single device and/or element and its current energy consumption may be collected by the control unit either. The current energy consumption may be based on electrical energy, but also on mechanical work, thermal energy and/or mass transport spent, generated and/or occurred during application of the sub-systems of the vehicle. The sub-systems may be for example compartment heating and cooling system, battery heating and cooling system, defogging system, stereo system, lighting system, propulsion system, brake system etc.

The control unit may be further configured to process information of the current state of the vehicle and generate image data based on the energy flow from the energy storage system to one or more sub-systems of the vehicle to create the energy flow map. The display unit may receive the image data and display the energy flow map. The energy flow map may be implemented as an infotainment application (app), which the user may select or launch via a communication system.

In an embodiment, the monitoring system may be connected to a communication system. The communication system may be configured to receive the user's input for a request and/or in response to a demand of the vehicle. The communication system may be integrated in the display unit by means of a GUI and/or arranged in a central console of the vehicle as a button, (rotary) knob and/or touch pad. Additionally or alternatively, the communication system may be also integrated in the infotainment system of the vehicle enabling a voice input and/or a gesture input. The user may be able to change the image on the display unit by using the communication system.

Further, the user may provide an input via the adjustment tool to adjust the energy consumption of the sub-system. For instance, if the user considers that an energy consumption of a specific sub-system is unnecessarily high as visualized in the display unit, the user may reduce its energy consumption or even disable the sub-system to reduce any energy loss. The user's input may be a change of at least one parameter causing the energy consumption. For instance, if the energy flow map shows that a battery cooling system consumes too much energy, the user may change a cooling temperature, cooling time and/or cooling number by means of the adjustment tool. Additionally, the user may deactivate one or more sub-systems via the adjustment tool. The adjustment tool may utilize the communication tool of the vehicle and its function may be implemented within the infotainment application of the energy flow map.

Accordingly, the user may easily obtain an overview over the energy flow inside the vehicle from the energy storage system to the sub-systems and optimize the energy consumption depending on a current state of the vehicle.

In an embodiment, the display unit is configured to display the energy flow map by means of a flow diagram. The energy flow map may be shown in a simplified diagram such as a hierarchy flowchart, a process flowchart or a Sankey graph. Such diagram may comprise a tree-like and/or breakdown structure with several internal branches (or nodes) to subdivide the energy flow from the energy storage system to the sub-systems of the vehicle and from the sub-systems to respective sub-devices and/or sub-elements.

The energy flow map may comprise several arrows each of which may represent the energy flow between the two linked sub-systems. Each arrow may be individually selected via the communication system, preferably, by touching the respective arrow on the display unit. Accordingly, a user-friendly energy flow map may be provided which allows the user an intuitive use.

In an embodiment, the display unit is configured to graphically emphasize a lower level of the sub-system on the energy flow map and/or graphically emphasize a higher level of the sub-system on the energy flow map. Along the flow diagram, the user may be able to reach a smaller unit of each sub-system. For instance, the user may select in a highest level of the energy flow map the energy flow from the energy storage system to a vehicle compartment system. In the following level, the energy flow from the vehicle compartment system as a whole to its sub-systems such as deicing windows/rear mirrors, internal lighting, seat heating and sound system and/or venting system may be shown. By selecting the venting system, the energy flow may be further zoomed in to the sub-devices of the venting system such as drying air, electrical fan and heater, etc. In addition, it is also possible to change the energy flow map to an upper level of the respective sub-system by touching a return icon and/or a root of the arrows indicating a higher sub-system.

In an embodiment, the adjustment tool is integrated in the display unit and the adjustment tool is configured to be graphically controlled. The adjustment tool may be an interface between the user and the control system to optimize the energy consumption of the sub-systems. Accordingly, the adjustment tool may be directly arranged in the energy flow map at each schematic element, preferably arrow, assigned to the respective sub-system. The adjustment tool may be directly shown or activated by selecting a corresponding icon. The adjustment tool may be provided with a scalar or a parameter to adjust performance of the respective sub-system and/or sub-element. Additionally or alternatively, the adjustment tool may comprise on/off button, too. Accordingly, the user may vary an energy consumption of a specific sub-system and/or sub-element individually and manually by using the adjustment tool overlaid in the display unit.

In an embodiment, the control unit is configured to simulate the energy consumption with respect to the user's input and display a result on the display unit. The control unit may also provide the user with a prognosis regarding available energy saving in case of a parameter change of one or more sub-systems. For this purpose, the user may select a simulation mode, which may be implemented in the energy flow map application and shown as an icon on the display unit. According to the simulation, the user may be able to adjust a parameter for a selected sub-system to optimize the energy consumption of the vehicle.

In an embodiment, the control unit is configured to display an explanatory text of the current energy consumption on the display unit. In addition to the schematic representation of the energy flow, the control unit may allow the display unit to show a short explanation on the energy consumption of the sub-system. The explanatory text may be shown alongside the respective sub-system, i.e. arrow or by means of a pop-up text. Accordingly, the user may obtain information, how and why energy is consumed in the vehicle or the sub-system. The explanatory text for each sub-system/-device or sub-element may advise the user which physical parameters affect the current energy consumption of the vehicle.

In an embodiment, the control unit is configured to calculate an optimal energy consumption based on the current energy consumption of the vehicle and the sub-system and display a suggestion text for optimizing the energy consumption on the display unit. The control unit may estimate an optimal energy consumption based on the collected information on the current state of the vehicle measured by various systems and/or sensors of the vehicle. The information on the current state of the vehicle may be created in calibrated computer models and constantly updated with data.

The control unit may prompt the display unit to visualize the calculated optimal energy consumption and/or suggestion text for adjusting a parameter of one or more sub-systems and/or sub-elements of the vehicle to save the current energy consumption. The suggestion text may be also represented by means of a pop-up text assigned to the respective sub-system on the energy flow map. Accordingly, the suggestion text may support the user to make a right decision to optimize the energy consumption.

In an embodiment, the control unit is configured to indicate a necessary energy consumption and/or an optional energy consumption on the display unit. Some sub-systems of the vehicle need to be continuously powered on and/or their energy consumption may not be manually adjusted by the user. Accordingly, the control unit may set the energy flow map to indicate, which sub-system requires a necessary and unchangeable energy consumption and which sub-system may be adjusted to save and/or optimize the energy consumption of the vehicle.

In an embodiment, the control unit is configured to display the energy flow map with an indicator to distinguish between the necessary energy consumption and the optional energy consumption. On the energy flow map, the necessary energy consumption and the optional energy consumption may be visually distinguishable by applying different colors of the arrow and/or the explanatory text. Additionally or alternatively, the necessary energy consumption and the optional energy consumption may be depicted with a different thickness of the arrows. Accordingly, the user may recognize at a glance, which parameter and/or sub-system may be manually controllable.

In an embodiment, the control unit is configured to display the energy flow map with an indicator to distinguish the energy consumption of several sub-systems of the vehicle. In the energy flow map, each schematic element, preferably each arrow may indicate a single energy transfer between two-linked systems. To distinguish the individual energy transfer and/or linked sub-systems, the schematic elements or the arrows may be differently indicated by color, thickness etc. Additionally or alternatively, each schematic elements may be numbered.

In an embodiment, the control unit is configured to dismiss the user's input adjusting the necessary energy consumption and/or to selectively allow a user to adjust the optional energy consumption. Accordingly, even though a wrong input of the user to adjust the necessary energy consumption, the control unit may deny such a command and maintain the necessary energy consumption. However, in case of the optional energy consumption, the control unit may allow adjusting the respective energy consumption according to the user's input.

In an embodiment, the display unit comprises a first section and a second section. The first section is configured to display the energy flow map and the second section is configured to display the explanatory text and/or the suggestion text. The display unit or a screen of the display unit may be divided at least into two sections to display various features of the energy flow map. Preferably, the flow diagram may be depicted in the first section and the explanatory text and/or the suggestion text may be displayed in the second section of the same screen to provide reliable information on the energy flow to the user.

In an embodiment, the control unit is configured to display the explanatory text and/or the suggestion text by means of a pop-up text on the display unit. The explanatory text and/or the suggestion text may be shown alongside the respective sub-system or by means of a pop-up text, which may be activated by touching a corresponding icon disposed on each schematic element of the respective sub-system. In other words, each arrow may comprise an icon or clickable icon to pop-up the explanatory text of the current energy consumption of the sub-system.

In an embodiment, the energy flow map may also comprise a circle diagram displaying, for instance recuperation, heat pumping and/or energy recovery.

According to the present disclosure, a vehicle is presented. The vehicle comprises a monitoring system described above. Hence, the user may receive not only an overview but also detailed information on an energy consumption in the vehicle. In addition, the user may manually and individually adjust the energy consumption of one or more sub-systems in the vehicle to minimize unnecessary energy loss, thus to utilize energy efficiently.

In an embodiment, the monitoring system is configured to be deactivated in case of an automatic monitoring mode of the vehicle. In other words, the entire energy flow map application may be disabled, if the user shift the monitoring system to an automatic mode. Additionally, the parameter(s) manually adjusted by the user may be canceled or retrieved based on the current energy consumption state of the vehicle.

According to the present disclosure, also a method for monitoring a vehicle is presented. The method comprises, but not necessarily in this order generating an energy flow map showing an energy flow from an energy storage system to at least one sub-system of the vehicle, displaying the energy flow map on a display unit, zooming into the energy flow map to display a current energy consumption of the sub system, and adjusting the energy consumption of the sub-system based on a user's input to an adjustment tool.

According to the present disclosure a computer program element for monitoring a vehicle is presented. The computer program element is adapted to perform the monitoring method as described above, which when being executed by a processing element.

It should be noted that the above embodiments may be combined with each other irrespective of the aspect involved. Accordingly, the method may be combined with structural features and, likewise, the system may be combined with features described above with regard to the method.

These and other aspects of the present disclosure will become apparent from and elucidated with reference to the embodiments described hereinafter.

BRIEF DESCRIPTION OF DRAWINGS

Exemplary embodiments of the disclosure will be described in the following with reference to the following drawings.

DESCRIPTION OF EMBODIMENTS

Figure 1:
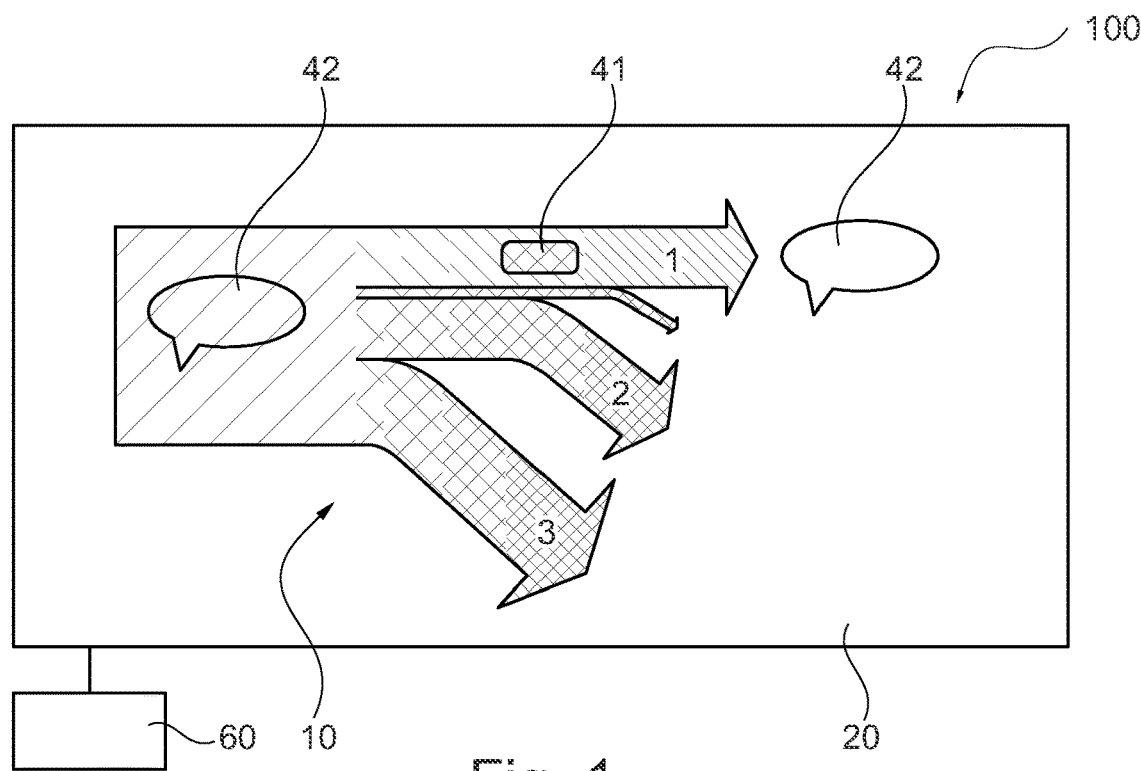
FIG. 1 shows schematically and exemplarily an embodiment of a monitoring system according to the present disclosure.
Figure 2:
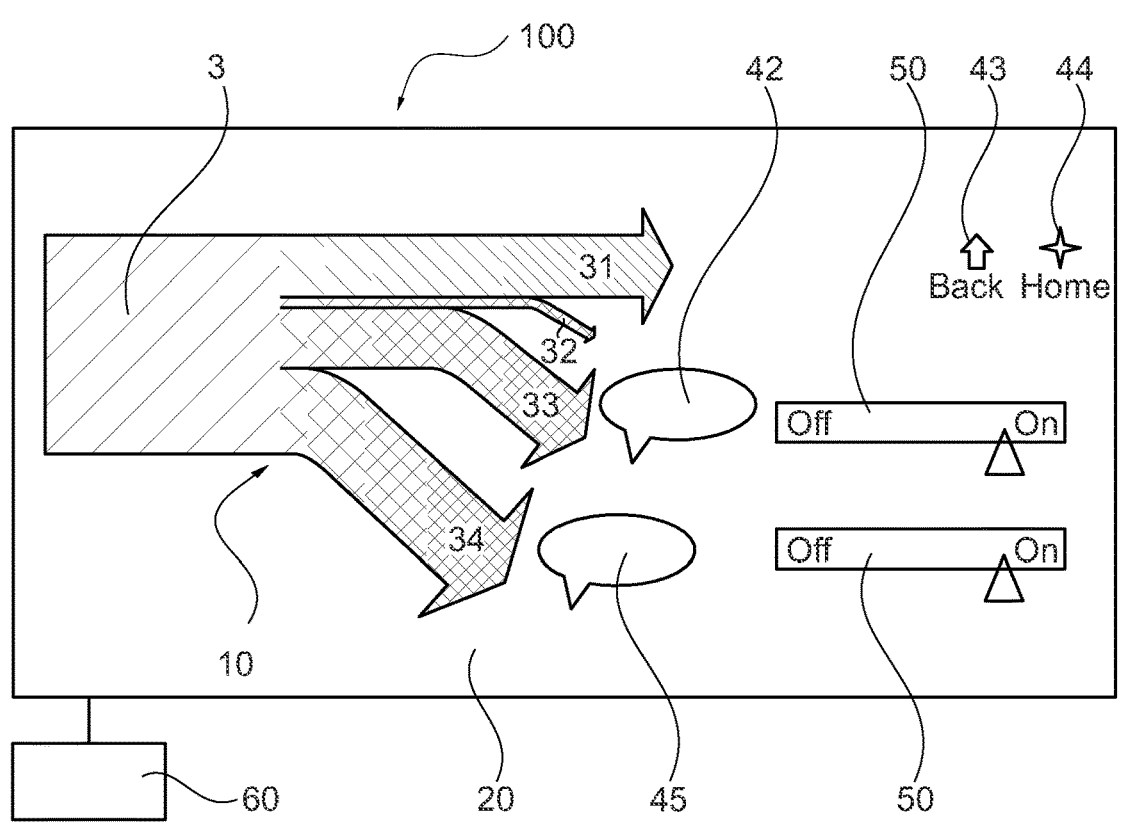
FIG. 2 shows schematically and exemplarily an embodiment of a monitoring system according to the present disclosure.

FIG. 1 and FIG. 2 show a monitoring system 100 for a vehicle. The monitoring system 100 is configured to monitor an energy flow in the vehicle from an energy storage system to one or more sub-systems of the vehicle. Thus, the monitoring system 100 provides information about overall energy consumption of the vehicle as well as an energy consumption of each sub-system. The monitoring system 100 is further configured to manually and individually adjust the energy consumption of the sub-system. The sub-systems may be for example compartment heating and cooling system, battery heating and cooling system, defogging system, stereo system, lighting system, propulsion system, brake system etc.

The monitoring system 100 comprises a display unit 20, an adjustment tool 50 and a control unit 60. The control unit 60 may be an electronic control unit and connected to various systems and sensors of the vehicle to collect continuously information on a current state of the vehicle. The control unit 60 generates image data according to the collected information to create an energy flow map 10. The energy flow map 10 may illustrate the energy flow from the energy storage system to one or more sub-systems and/or sub-devices of the vehicle based on electrical, mechanical, thermal energy consumption and/or mass transport in the vehicle.

The display unit 20 is configured to visualize image data received from the control unit 60 and to display the energy flow map 10. The display unit 20 may be integrated in a Center Stack Display (SCD), Drivers Information Module (DIM) and/or Infotainment Head Unit (IHU). The display unit 20 may be further configured to visualize, for example vehicle information, entertainment programs, navigation assistance and/or any application set by the user. In the display unit 20, a graphical user interface (GUI) may be embedded to realize an interaction with the user via the display unit 20.

The energy flow map 10 is represented as a Sankey flow diagram. Such diagram has a breakdown structure to show a flow from a higher system (root) to sub-systems (branches). Accordingly, the energy flow map 10 exhibits the energy flow from the energy storage system to the sub-systems of the vehicle and from the sub-systems to respective sub-devices and/or sub-elements. Each energy flow between two systems may be connected via a schematic element such as an arrow. To indicate a different level of the linked system, the arrows may have different colors and/or thickness.

Each arrow of the energy flow map 10 can be individually selected. Hence, the energy flow map 10 may be zoomed into a lower level of the sub-system by touching the respective arrow. Additionally, the energy flow map 10 may be zoomed out to a higher level of the sub-system by touching the root area of the energy flow map 10 and/or clicking a return icon 43 or home icon 44.

The energy flow map 10 comprises at least one adjustment tool 50 configured to receive user's input to adjust the energy consumption. The adjustment tool 50 is preferably arranged to individually set parameter of each sub-system, i.e. each arrow by the user for optimizing the energy consumption of the respective sub-system. The parameter may be variable by means of a scalar. The adjustment tool 50 may also comprise an on/off function. Accordingly, the adjustment tool 50 may be controlled graphically over the display unit 20.

In addition, each arrow of the energy flow map 10 may have a different color or thickness to indicate which energy consumption is necessary, thus may not be changed and which energy consumption is optional. For instance, an arrow for the necessary energy consumption may be marked red whereas an arrow for the optional energy consumption may be marked green. Additionally or alternatively to the graphical indicator, the necessary and the optional energy consumption are marked with a text.

The control unit 60 is further configured to implement displaying an explanatory text 42 of the current energy consumption and/or a suggestion text 45. The control unit 60 may allow the display unit 20 to show a short explanation on the current energy consumption of the respective sub-system. Additionally or alternatively, the control unit 60 is configured to calculate an optimal energy consumption based on the current energy consumption and may allow the display unit 20 to show a suggestion text 45 for optimizing the energy consumption. The explanatory text 42 and/or the suggestion text 45 can be directly arranged alongside the corresponding sub-system, i.e. arrow or displayed as a pop-up text by clicking a corresponding icon 41 arranged on each arrow.

The display unit 20 can be divided into a first section and a second section. The first section depicts the energy flow map 10 and the second section displays the explanatory text 42, the suggestion text 45 and/or the adjustment tool 50. Accordingly, the user may easily obtain an overview over the energy flow inside the vehicle from the energy storage system to the sub-systems and optimize the energy consumption depending on the current situation of the vehicle.

For instance, FIG. 1 shows an entire energy consumption of the vehicle at a first level of the energy flow map 10. Entire energy from the energy storage system with 100% battery power is transferred to propulsion system 1 (25%), friction losses (5%) compartment system 2 (30%) and battery heating/cooling system 3 (40%). The explanatory texts 42 for each arrow may be automatically shown alongside each sub-system or arrow or by activating the pop-up icon 41. The user may reach a second level by clicking one of the arrow, for instance the battery heating/cooling system 3.

FIG. 2 shows the energy flow map 10 in the second level to which sub-system the energy of the battery heating/cooling system 3 is transferred. The energy flow from the heating/cooling system 3 is subdivided in the second level such that the energy is distributed for battery heating for function 31 (25%), sensors 32 (5%), battery heating for performance 33 (20%) and battery heating for fast charging 34 (50%). By operating the adjustment tool 50, i.e. deactivating the battery heating for performance and the battery heating for fast charging, the vehicle may drive with a lower performance and longer charging time but the energy consumption of the battery heating/cooling system 2 can be reduced.

In another example, the compartment system 3 can be selected in the first level of the energy flow map 10. Accordingly, in the second level of the energy flow map 10 it is represented that to which sub-system the energy of the compartment system 3 is transferred. The energy consumption of the compartment system 3 may be divided into deicing windows and rear mirrors, internal lighting, seat heating and sound system and venting system. By clicking the venting system displayed on the display unit 20, the energy flow map 10 may show the next level, how the energy consumption of the venting system is distributed. Hence, by selecting an arrow, the user may reach the next detailed level, which may support the user to make a right decision to adjust a parameter of each sub-system or element to optimize and save the energy consumption of the vehicle.

It has to be noted that embodiments of the disclosure are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A monitoring system for a vehicle, comprising
   a display unit; and
   a control unit configured to:

determine respective electric energy consumptions of sub-systems of a vehicle at a plurality of levels of the sub-systems of the vehicle, wherein a lowest level of the plurality of levels corresponds to a lowest level of individually controllable sub-systems of the vehicle with respect to electric energy consumption;

generate an energy flow map showing electric energy flow from an electric energy storage system to the sub-systems of the vehicle, wherein the energy flow map comprises displays of the plurality of levels of the sub-systems of the vehicle;

display the energy flow map on the display unit, wherein the energy flow map indicates the respective electric energy consumptions of one or more of the plurality of levels of the sub-systems; and adjust the electric energy consumption of a sub-system of the vehicle based on a user input to the energy flow map comprising an adjustment to the sub-system.

2. The monitoring system of claim 1, wherein the energy flow map comprises a flow diagram of the electric energy flow.

3. The monitoring system of claim 1, wherein the display unit is configured to graphically emphasize a lower level of the sub-system on the energy flow map or graphically emphasize a higher level of the sub-system on the energy flow map.

4. The monitoring system of claim 1, wherein the control unit predicts an electric energy consumption savings based on performing an energy consumption simulation using the user input.

5. The monitoring system of claim 4, wherein the control unit displays the predicted electric energy consumption savings on the energy flow map.

6. The monitoring system of claim 1, wherein the control unit displays an explanatory text of the electric energy consumption of the sub-system on the display unit.

7. The monitoring system of claim 1, wherein the control unit determines an optimal electric energy consumption for the vehicle based on the respective electric energy consumptions of the plurality levels of sub-systems of the vehicle, and displays a suggestion text on the energy flow map for adjusting one or more of the sub-systems related to achieving the optimal electric energy consumption.

8. The monitoring system of claim 1, wherein the control unit indicates at least one of a necessary electric energy consumption of the vehicle or an optional electric energy consumption of the vehicle on the energy flow map.

9. The monitoring system of claim 8, wherein the control unit displays an indicator to distinguish between the necessary electric energy consumption and the optional electric energy consumption.

10. The monitoring system of claim 8, wherein the control unit dismisses the user input in response to determining that the sub-system is associated with the necessary electric energy consumption.

11. The monitoring system of claim 6, wherein the display unit comprising a first section and a second section, the first section being configured to display the energy flow map and the second section being configured to display the explanatory text.

12. The monitoring system of claim 7, wherein the control unit displays the suggestion text by a pop-up on the display unit.

13. A vehicle comprising a monitoring system, the monitoring system comprising:
a display unit; and
a control unit configured to:
determine respective electric energy consumptions of sub-systems of a vehicle at a plurality of levels of the sub-systems of the vehicle, wherein a lowest level of the plurality of levels corresponds to a lowest level of individually controllable sub-systems of the vehicle with respect to electric energy consumption;

generate an energy flow map showing electric energy flow from an electric energy storage system to the sub-systems of the vehicle, wherein the energy flow map comprises displays of the plurality of levels of the sub-systems of the vehicle;

display the energy flow map on the display unit, wherein the energy flow map indicates the respective electric energy consumptions of one or more of the plurality of levels of the sub-systems; and adjust the electric energy consumption of a sub-system of the vehicle based on a user input to the energy flow map comprising an adjustment to the sub-system.

14. The vehicle according to claim 13, the monitoring system being configured to be deactivated in case of an automatic monitoring mode of the vehicle.

15. A method, comprising:
determining, by a system comprising a processor, respective electric energy consumptions of sub-systems of a vehicle at a plurality of levels of the sub-systems of the vehicle, wherein a lowest level of the plurality of levels corresponds to a lowest level of individually controllable sub-systems of the vehicle with respect to electric energy consumption;

generating, by the system, an energy flow map showing electric energy flow from an electric energy storage system to the sub-systems of the vehicle, wherein the energy flow map comprises displays of the plurality of levels of the sub-systems of the vehicle;

displaying, by the system, the energy flow map on a display unit, wherein the energy flow map indicates the respective energy consumptions of one or more of the plurality of levels of the sub-systems; and adjusting, by the system, the electric energy consumption of a sub-system based on a user input to the energy flow map comprising an adjustment to the sub-system.

16. The method of claim 15, wherein the energy flow map comprises a flow diagram of the electric energy flow.

17. The method of claim 15, wherein the energy flow map is user navigable amongst the plurality of levels of the graphical displays based on one or more user inputs.

18. A computer program product comprising a non-transitory computer readable medium having program elements embodied therewith, the program elements executable by a processor to cause the processor to:
determine respective electric energy consumptions of sub-systems of a vehicle at a plurality of levels of the sub-systems of the vehicle, wherein a lowest level of the plurality of levels corresponds to a lowest level of individually controllable sub-systems of the vehicle with respect to electric energy consumption;

generate an energy flow map showing electric energy flow from an electric energy storage system to the sub-systems of the vehicle, wherein the energy flow map comprises displays of the plurality of levels of the sub-systems of the vehicle;

display the energy flow map on a display unit, wherein the energy flow map indicates the respective electric energy consumptions of one or more of the plurality of levels of the sub-systems; and adjust the electric energy consumption of a sub-system based on a user input to the energy flow map comprising an adjustment to the sub-system.

19. The computer program product of claim 18, wherein the energy flow map comprises a flow diagram of the electric energy flow.

20. The computer program product of claim 18, wherein the energy flow map is user navigable amongst the plurality of levels of the displays based on one or more user inputs.

* * * * *